Patented Dec. 2, 1947

2,431,704

UNITED STATES PATENT OFFICE 2,431,704

FROZEN DESSERT COMPOSITION

Sidney Musher, New York, N. Y.

No Drawing. Application August 3, 1944,
Serial No. 547,985

7 Claims. (Cl. 99—136)

1

The present invention relates to physically stabilized frozen dessert compositions including ice cream, sherbets and ices and to the method of making the same and particularly refers to physically stabilized milk sherbet and ice sherbet compositions referred to herein as "sherbet."

The manufacture of an ice sherbet or milk sherbet of fine body and texture is very difficult because of the large number of factors that must be controlled and because of the variety of characteristics that must be produced.

For example, although gelatin is widely used as a complete stabilizer for ice cream, it is unsatisfactory as a complete stabilizer for sherbets and produces a sherbet of uncontrolled overrun, coarse texture and other undesirable characteristics.

An object of the present invention is therefore to produce a sherbet composition that has controlled overrun, or in which the amount of air incorporated in the sherbet during freezing is within the most highly desirable limits; to avoid bleeding or leakage of the melted ice crystals; to maintain excellent body and texture and other physical characteristics and to produce a sherbet that will resemble ice cream in its "feel" in the mouth, which objects are to be accomplished by economical and simple means.

A further object is a special method for the employment of oat flour in the manufacture of ice cream, milk sherbets and ice sherbets whereby the maximum benefits of the oat flour are utilized in the frozen dessert composition.

Still further objects and advantages will appear from the more detailed description set forth below, it being understood, however, that this more detailed description is given by way of illustration and explanation only, and not by way of limitation, since various changes therein may be made by those skilled in the art without departing from the scope and spirit of the present invention.

In accordance with the procedures of the present invention, it has been found that where oat flour is combined with gelatin and sugar and then heated in water or milk to a temperature of at least about 175° F. and desirably to a temperature of between 200° F. and 220° F., that unusual physical stabilization is obtained where the said heated composition is then added to the mix ingredients of a frozen dessert composition.

The oat flour referred to herein is ordinary oat flour which is made by dehulling the oat groats or by any similar method for the manufacture of oat flour. This oat flour will contain a

2 relatively high proportion of starch and a relatively low proportion of protein, the protein content being within the approximate range of 14% and 17.5% and desirably being about 16%.

The sugar which is utilized can be any mono saccharide or di saccharide or similar sweetening agent such as cane sugar, beet sugar, corn sugar, corn syrup, dextrose, honey, etc.

The gelatin and oat flour are combined in the proportions of between about 1 and 4 parts of the oat flour to each 1 part of the gelatin. It is preferred to use between 2 and 3 parts of the oat flour to each part of the gelatin.

One part of the combination of oat flour and gelatin (or where no gelatin is used, 1 part of the oat flour itself) is then combined with from 1 to 8 parts and preferably 1 to 4 parts of a sugar and from 5 to 20 parts and preferably 5 to 12 parts of water or milk, including skim milk and whole milk.

This combination is then mixed thoroughly and heated to at least about 175° F. and desirably to between 190° F. and 220° F. for a short period of time ranging from a fraction of a minute to 10 or 15 minutes.

The combination may then be cooled and added to the sherbet mix or the cooling step may be omitted particularly where the combination is added to a sherbet mix or frozen dessert mix before pasteurization at, for example 145° F. for 30 minutes.

The heating of the gelatin, oat flour and sugar in the water or milk or other aqueous composition may be conducted by the injection of steam or in steam jacketed pans or in other available manner.

It has been found that when this procedure is used most desirable physical characteristics are obtained and the results are superior to either where the oat flour is heated in water or milk alone or whereby any other method of processing is utilized.

Apparently some reaction takes place where the oat flour, gelatin and sugar are heated in the water or milk in the manner described. A less preferable procedure is to omit the gelatin from the mixing and heating operations and when this is done the stabilizing properties of gelatin are not enhanced as is obtained where the gelatin is included in the heating with the oat flour, sugar and with water or milk.

In the case of sherbets there are obtained by this procedure properly controlled overrun, smoothness, elimination of bleeding or leakage, elimination of crystallization, and fine body and texture. In the case of milk sherbets where an overrun, for example, of 30% to 35% is desirable or in the manufacture of ice sherbets where an overrun of 20% to 25% is desirable it has been found that the method of manufacture of the sherbet herein described produces the most desirable physical characteristics in both shortening the time required to produce the sherbet and improving materially the quality of the milk sherbet or ice sherbet to produce an excellently bodied product.

By the term "sherbet" or "sherbet composition" there are included both the so-called milk sherbets as well as the ice sherbets. For example, the milk sherbets include the frozen product made from milk products, water, sugar, fruit, flavoring or coloring and with the stabilizer set forth herein and the freezing of which has been accompanied by agitation of the ingredients. Milk sherbets will contain not to exceed about 8% by weight of milk-solids-not-fat and generally will contain relatively no butter fat although up to about 1% to 2% butter fat may be present. Ice sherbet includes the frozen products made from water, sugar, with fruit, flavoring and coloring as well as with the stabilizer set forth herein and in the manufacture of which the freezing has been accompanied by agitation of the ingredients. The ice sherbet contains no milk solids. Although milk sherbet and ice sherbet generally are made at a relatively low pH such as at between about pH 2.5 and 4.0 and preferably between pH 2.8 and pH 3.6, where the fruits give insufficient acidity to produce this pH, citric acid, tartaric acid, phosphoric acid, or similar edible acid may be added.

Flavoring materials may include essential oils, fruit and fruit extracts such as raspberries, strawberries, cherries, bananas, citrus products, citrus concentrates, fresh and frozen fruits, preserved and canned fruits.

The sherbet mix may be pasteurized at, for example, 145° F. for 30 minutes or at 165° F. for 15 to 25 minutes and then cooled and frozen with agitation.

A highly desirable milk sherbet formula is given below.

10 lbs. to 16 lbs. of skim milk.
14 lbs. of sugar.
8 ounces oat flour.
3–4 ounces gelatin.
3–4 ounces of 50% citric acid solution or equivalent.
Fruit, color and water to make 5 gallons.
The 14 lbs. of sugar include the sugar in the fruit added.

The following formula is given for a typical ice or ice sherbet:

14 lbs. of sugar.
8 ounces oat flour.
3–4 ounces gelatin.
3–4 ounces of 50% citric acid solution or equivalent.
Fruit, color and water to make 5 gallons.
The 14 lbs. of sugar include the sugar in the fruit added.

In both cases, as indicated above, the oat flour and gelatin are combined as, for example, with 1 pound of sugar, mixed thoroughly, and then heated in three quarts of water or skim milk to about 175° F. and preferably to between 190° F. and 220° F. The mixture may then where desired be cooled and the mixture is added to the milk sherbet or ice sherbet mix, followed by pasteurizing where desired and freezing with agitation.

The oat flour is added to the frozen dessert composition and preferably to the sherbet composition in an amount of between about 0.5% and 1.25% and preferably in an amount of between 0.75% and 1.0%. For example, in the formulas given above there is utilized approximately 1% of oat flour and 0.4% to 0.5% gelatin against the total weight of the mix ingredients of the sherbet composition.

In the manufacture of ice cream it is also necessary to obtain a combination of characteristics for the production of the highest grade ice cream, such as proper viscosity, as well as resistance to formation of ice and lactose crystals upon holding in dealers' cabinets, good body and texture, proper "chewing" qualities and proper over-run and air incorporation within the time limits normally set for freezing. This problem is a special one in the ice cream industry as viscosity alone or gum action alone which might be sufficient for an ordinary food product is not sufficient for ice cream as ice cream presents special and peculiar problems limited to the ice cream industry.

The combination of oat flour and sugar which has previously been heated in water or milk to at least 175° F. and preferably to between 190° F. and 220° F. and particularly where gelatin is also present in the proportions set forth above is added to the ice cream ingredients desirably before homogenizing.

For example, all the ice cream ingredients are first added to the pasteurizer and then this combination may be added before pasteurizing or the ice cream ingredients may first be pasteurized and then this combination may be added after pasteurizing and before homogenizing. In any event, the combination is thoroughly distributed throughout the body of the ice cream mix in order to obtain a thorough dispersion of the combination herein set forth in the mix. The ice cream mix containing this special combination may then be homogenized such as at about 1500 to 2500 pounds pressure following which the ice cream mix is cooled and frozen in either the usual type of continuous or batch freezer, the freezing being accompanied by agitation so as to incorporate sufficient air to produce about 80% to 110% of over-run.

By the term "mix ingredients" is meant in the case of sherbets the usual ingredients employed in the manufacture of milk sherbet or ice sherbet such as milk, water, sugar, flavor, fruit, acid, etc., and in the case of ice cream is meant the usual ingredients employed in the manufacture of ice cream such as dairy products including cream, milk, butter, butterfat, condensed milk, condensed skim milk, skim milk powder, whole milk powder, etc., and also water, sugars such as sucrose, dextrose, corn syrup, honey, etc., flavoring materials such as vanilla, chocolate, cocoa, nuts, fruits and other flavors both natural and synthetic and also artificial color where desired.

The ice cream will contain by weight between about 10% and 15% of butterfat and generally between about 12% and 13.5% of butterfat. The total amount of milk solids not fat will amount to between about 8% and 12% and generally between about 10% and 11.5%.

It is also possible to add the combination herein described after pasteurizing and after homogenizing such as by adding it directly to the freezer and while the ice cream ingredients are being frozen. This is, however, a much less desirable procedure.

In addition to this method for the treatment of sherbets and ice cream, such other frozen dessert compositions as ice milk may be similarly prepared. Ice milk will normally contain between about 8% and 15% by weight of milk solids not fat but the butterfat content will be much less than the butterfat content of ice cream and will approximate between about 4% and 6.5% of butterfat.

Since both ice cream and ice milk carry some butterfat content and since they both contain relatively large amounts of milk solids not fat as indicated above they are both subject to ice and lactose crystal formation and to problems of obtaining desirable viscosity, body and texture and proper physical characteristics when held in the dealers' cabinets over normal periods of time. In the case of ice milk, the method of manufacture is similar to that set forth for the manufacture of ice cream.

Of particular advantage in the preparation of the heated combination of the oat flour and sugar and water or milk and preferably where gelatin is also present in the manufacture of the frozen dessert composition in the special method set forth herein is the fact that greater stabilization and finer body and texture are obtained and whereby at least about 25% and as much as 50% less total stabilizer may be required when using this method as against where oat flour, sugar and gelatin are added in the normal manner or in any other manner than is set forth by the herein described method. Since stabilizer cost is so important and since the obtaining of fine body and texture and other desirable physical characteristics are so necessary in the manufacture of frozen dessert compositions, the herein described method whereby the values of oat flour and gelatin are very materially enhanced is an important one in the manufacture of these frozen dessert compositions.

Where desired, the fat may be extracted from the oat flour such as by treatment of the oat flour with a fat solvent. Among the fat solvents that are desirably used are included the volatile hydrocarbon solvents such as benzine, hexane, N-pentane, etc., as well as acetone which has been found highly satisfactory. There may also be very desirably used the low molecular weight aliphatic alcohols, particularly isopropyl alcohol but including also methanol, ethanol or propanol.

Among the other solvents that may be employed are carbon tetrachloride, carbon disulphide, dichlorethylene, trichlorethylene, dichlorethylether or similar fat solvents or combinations of any of the above may also be employed. Other fat soluble solvents may also be utilized and it is desirable for a maximum amount of the fat to be removed as would be done in any normal commercial procedure.

Less preferably, other stabilizers may be utilized in the manufacture of frozen dessert compositions such as algin, Irish moss, locust bean gum, sodium alginate, etc.

There may also be incorporated along with the oat flour minor amounts of mono glycerides or di glycerides or of polyhydric alcohol in which at least one of the hydroxyl groups is free and in which at least one of the hydroxyl groups is replaced by a fatty acid radical.

In the production of the oat flour it is preferred to dehull the oats in their "green" or undried condition, which is quite different from the operation normally utilized in dehulling procedures and particularly in the dehulling of oats. In other words, the oats are desirably not subjected to any drying or desiccating or roasting procedures as is commonly done in the treatment of whole oats before the hulls are removed.

Where, however, the whole oats are to be dried from, for example, 12% to 13% of moisture content to 6% to 7% or less of moisture content, it is preferable for the drying operation to be carried out at a temperature not exceeding about 170° F. and preferably not exceeding about 150° F. Roasting of the oats or drying of the oats at a temperature of over 170° F. is preferably to be avoided.

The whole oats may less desirably be desiccated or dried in the normal manner by placing in open pans which are steam jacketed until they are dried to a moisture content of less than about 7% but this is a less preferable procedure.

The oats are then dehulled preferably without damage or change to the oat groat fraction so that only the hulls themselves are removed leaving the whole oat groat which oat groats have desirably not been subjected to a temperature in excess of 170° F. and preferably to not over 150° F.

The oat groats are then ground to produce the oat flour which is utilized in accordance with the procedures of the present invention. The oat flour which is obtained from ground oat groats which have been dehulled in their "green" condition and the flour of which has not at any stage been subjected to a temperature in excess of 170° F. and desirably not in excess of 150° F. has very unusual characteristics which make it particularly valuable for use in the manufacture of a wide variety of food and pharmaceutical products particularly where stabilizing characteristics are desired.

By the term "frozen dessert" as used in the specification and claims there are included ice cream, ice milk, sherbets such as milk sherbet, and ices, such as water ices.

Having described my invention, what I claim is:

1. A method of producing frozen dessert compositions which comprises preparing a combination of oat flour and a sugar in the approximate proportions of 1 part of the oat flour to between 1 and 8 parts of a sugar, heating the said combination in an aqueous material selected from the group consisting of water and milk to a temperature of at least 175° F. and then adding the said heated combination to the mix ingredients of a frozen dessert composition.

2. A method of producing frozen dessert compositions which comprises preparing a combination of oat flour and a sugar in the approximate proportions of 1 part of the oat flour to between 1 and 8 parts of a sugar, heating the said combination in an aqueous material selected from the group consisting of water and milk to a temperature of at least 175° F., the aqueous material being present in the approximate proportions of between 5 and 12 parts to each 1 part of the oat flour and then adding said heated combination to the mix ingredients of a frozen dessert composition.

3. A method of producing a frozen dessert composition which comprises preparing a combination of oat flour, a sugar and gelatin, in the approximate proportions of 1 to 4 parts of oat flour to each 1 part of gelatin and 1 to 8 parts of a sugar to each 1 part of the gelatin and sugar combined, heating the said combination comprising oat flour, gelatin and a sugar in an aqueous material selected from the group consisting of water and milk to a temperature of at least 175° F. and then adding the said heated combination to the mix ingredients of a frozen dessert composition.

4. A method of producing frozen dessert compositions which comprises preparing a combination of oat flour and a sugar in the approximate proportions of 1 part of the oat flour to between 1 and 8 parts of a sugar, heating the said combination in an aqueous material selected from the group consisting of water and milk to a temperature of between 190° F. and 220° F. and then adding the said heated combination to the mix ingredients of a frozen dessert composition.

5. A method of producing a sherbet composition which comprises preparing a combination of oat flour and a sugar in the approximate proportions of 1 part of the oat flour to between 1 and 8 parts of a sugar, heating the said combination in an aqueous material selected from the group consisting of water and milk to a temperature of at least 175° F., the aqueous material being present in the approximate proportions of between 5 and 12 parts to each 1 part of the oat flour and then adding said heated combination to the mix ingredients of a sherbet composition.

6. A method of producing an ice cream composition which comprises preparing a combination of oat flour and a sugar in the approximate proportions of 1 part of the oat flour to between 1 and 8 parts of a sugar, heating the said combination in an aqueous material selected from the group consisting of water and milk to a temperature of at least 175° F., the aqueous material being present in the approximate proportions of between 5 and 12 parts to each 1 part of the oat flour and then adding said heated combination to the mix ingredients of an ice cream composition.

7. A method of producing a sherbet composition having controlled overrun, fine body and texture and which is substantially free of crystallization which comprises preparing a combination of oat flour, sugar and gelatin in the approximate proportions of 1 part of the oat flour to between 1 and 8 parts of the sugar and 1 part of the gelatin to between 1 and 4 parts of the oat flour, heating the said combination in an aqueous material selected from the group consisting of water and milk to a temperature of at least 175° F., the aqueous material being present in the approximate proportions of between 5 and 12 parts to each 1 part of the oat flour and then adding said heated combination to the mix ingredients of a sherbet composition.

SIDNEY MUSHER.

REFERENCES CITED

The following references are of record in the file of this patent:

UNITED STATES PATENTS

| Number | Name | Date |
|---|---|---|
| 2,355,031 | Musher | Aug. 1, 1944 |
| 2,355,032 | Musher | Aug. 1, 1944 |
| 2,355,547 | Musher | Aug. 8, 1944 |
| 2,176,033 | Musher | Oct. 10, 1939 |
| 2,176,023 | Musher | Oct. 10, 1939 |
| 2,176,022 | Musher | Oct. 10, 1939 |
| 1,401,498 | Sasseen | Dec. 27, 1931 |

OTHER REFERENCES

Food Manufacturer, Mar. 1, 1941, vol. XVI, No. 3.

"Ice Cream Manufacture in 1941," by L. J. Hynes, pages 60 and 61.